June 21, 1966  W. H. PHELPS  3,256,681
REVERSING HANDLE MOWER WITH REVERSING DRIVE
Filed Aug. 30, 1963  3 Sheets-Sheet 1

Inventor:
William H. Phelps
By: Hofgren, Wegner, Allen,
Stellman & McCord
Attorneys June 21, 1966  W. H. PHELPS  3,256,681
REVERSING HANDLE MOWER WITH REVERSING DRIVE
Filed Aug. 30, 1963  3 Sheets-Sheet 2
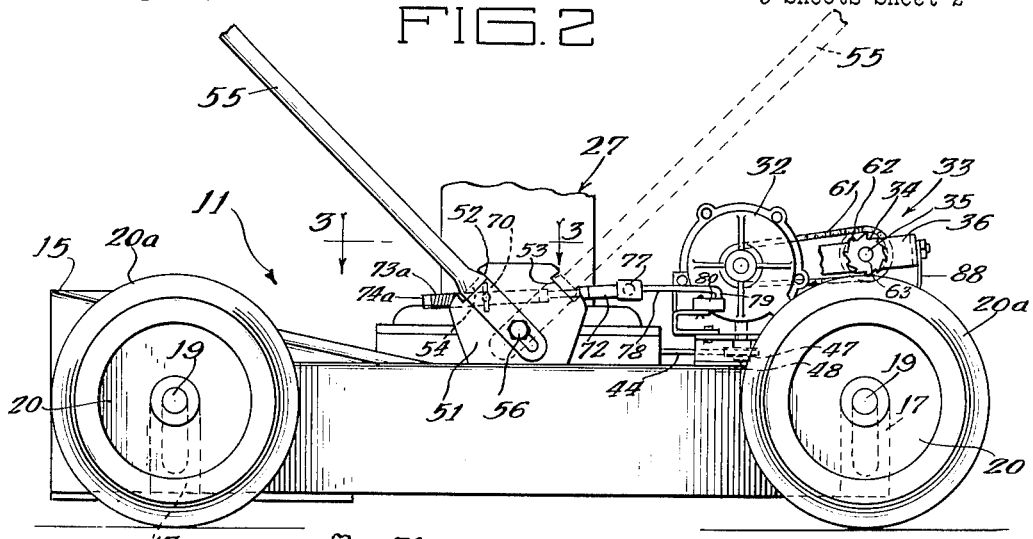
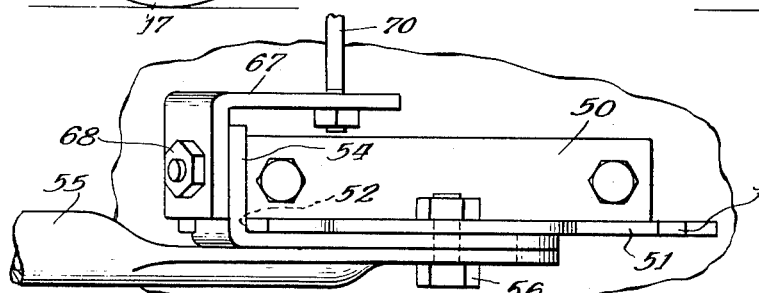
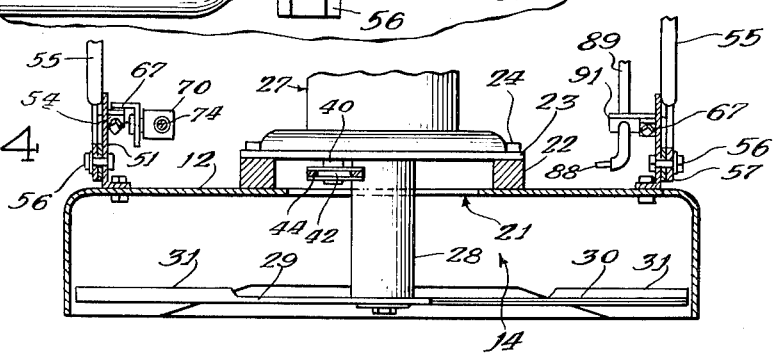
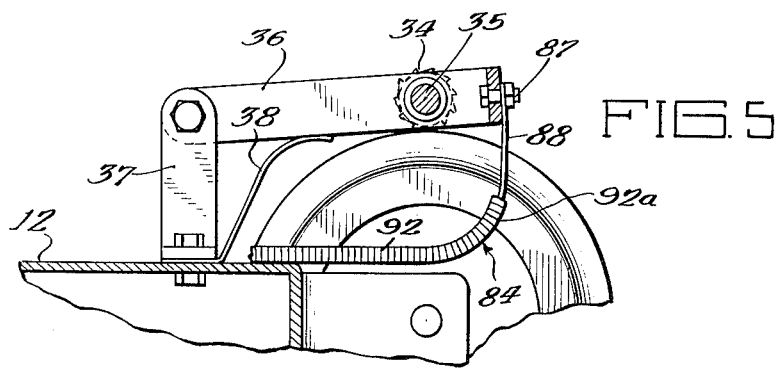

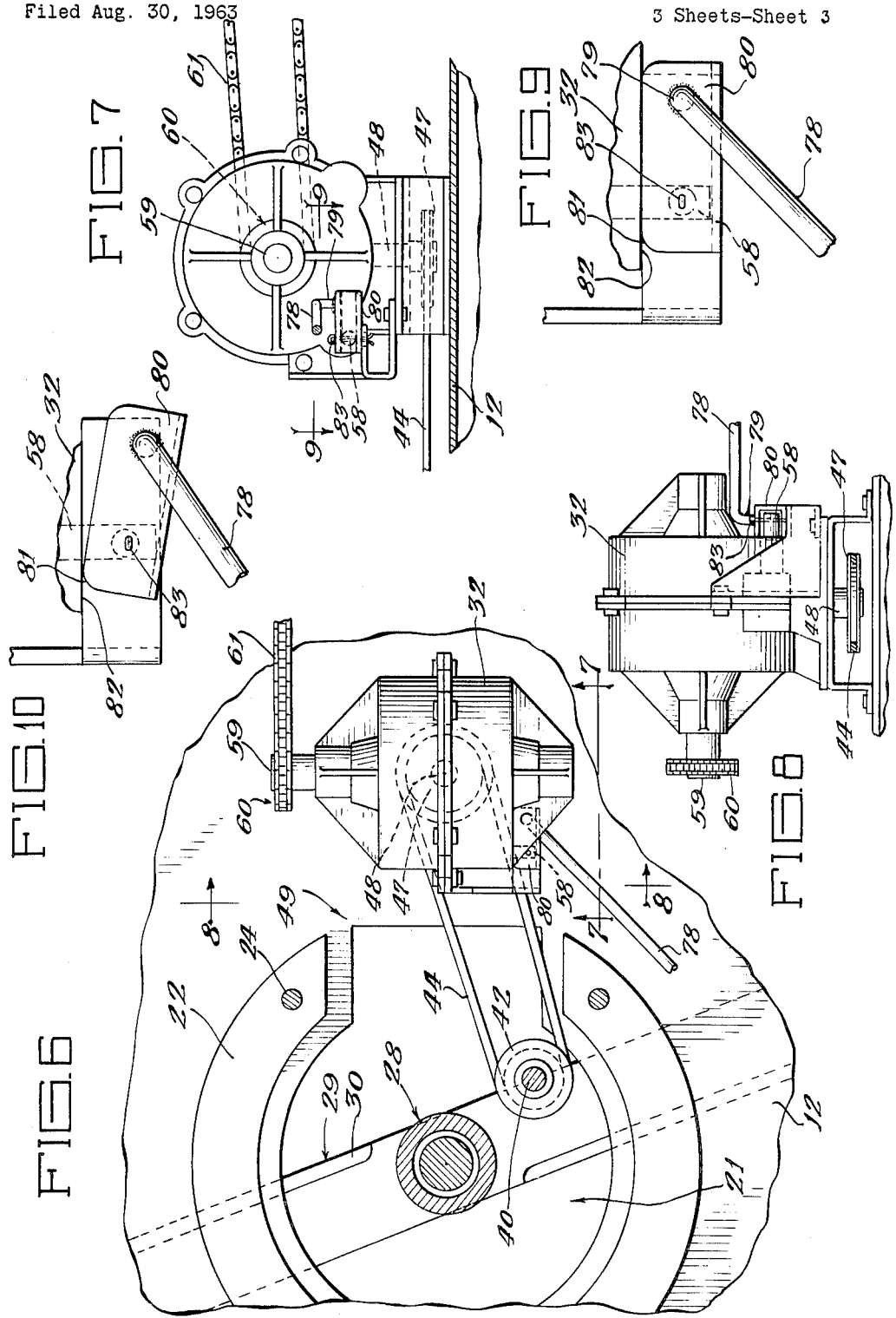

3,256,681
REVERSING HANDLE MOWER WITH REVERSING DRIVE

William Howard Phelps, 7577 Burlington St., Ralston, Nebr.
Filed Aug. 30, 1963, Ser. No. 305,755
8 Claims. (Cl. 56—25.4)

This invention relates to such wheeled devices as rotary power mowers, and especially relates to drive systems therefor. In a particular aspect, this invention is concerned with a reversible drive for rotary power mowers for reversing the direction of mower movement.

The principal object of this invention is to provide an improved rotary power mower that may be driven in either of two opposed directions.

It is another object of this invention to provide a new and useful rotary power mower having a swing-over steering handle with a drive reversible in response to change of handle position.

Another object is to provide a rotary power mower wherein a carriage and cutter blade are each driven by a motor and steerable by a handle and including a control system accessible from the handle for disabling the carriage drive.

Still another object of this invention is to provide a rotary mower of the rotary blade type which is operable by an operator walking behind the mower and which may be operated to drive in either of two opposing directions for discharging grass always to the same side of the mower, and which may be readily, easily and safely reversed in its direction of movement as desired.

A further object of this invention is to provide a rotary power mower which may be driven selectively via front or rear wheel drive.

Other objects of this invention will be apparent from the following description and from the drawings in which:

FIGURE 2 is a fragmentary side elevational view of the mower;

FIGURE 3 is a fragmentary section on an enlarged scale, taken substantially as indicated along the line 3—3 of FIGURE 2;

FIGURE 4 is a fragmentary vertical section through the mower along line 4—4 of FIGURE 1;

FIGURE 5 is a fragmentary section on an enlarged scale along line 5—5 of FIGURE 1;

FIGURE 6 is a fragmentary plan view on an enlarged scale with the gasoline motor and cowling removed and the motor drive shaft and cowling mounting bolts each shown in section;

FIGURE 7 is a fragmentary sectional view along line 7—7 of FIGURE 6;

FIGURE 8 is a fragmentary sectional view along line 8—8 of FIGURE 6;

FIGURE 9 is a fragmentary sectional view on an enlarged scale taken substantially as indicated along the line 9—9 of FIGURE 7, with the transmission reversing mechanism in a first position; and FIGURE 10 is a view like FIGURE 9 with the transmission reversing mechanism in a second position.

Figure 1:
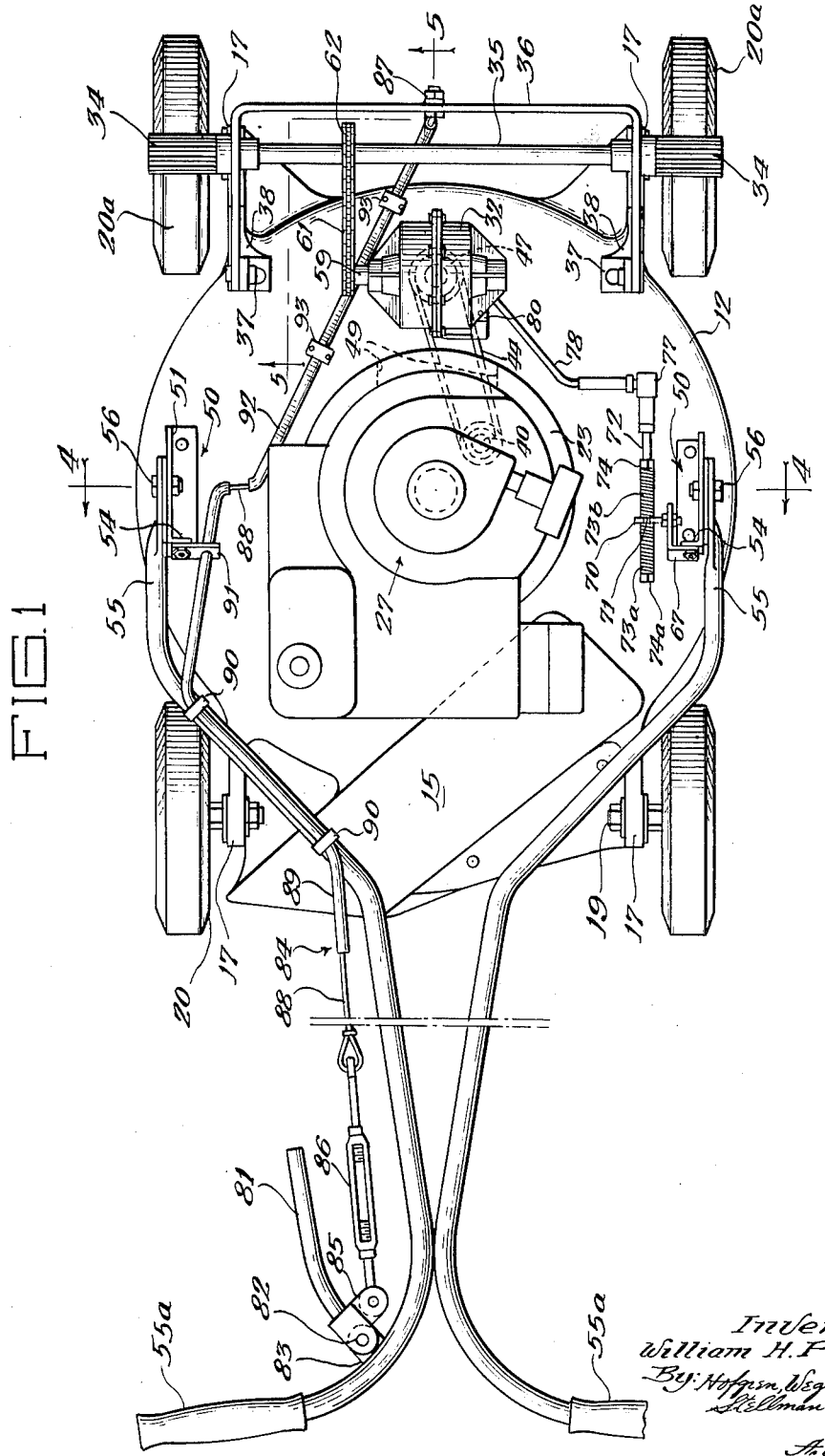
FIGURE 1 is a plan view of a preferred embodiment of a rotary power mower in accordance with the present invention.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

Referring to the drawings in greater detail, and referring first to FIGURES 1, 2 and 4, the illustrated form of power mower is generally in accordance with the disclosure of my U.S. Patent No. 2,983,096, entitled "Rotary Cutter and Housing Structure," patented May 9, 1961. Accordingly, the mower includes a carriage 11 comprised of a plate-like circular horizontal frame 12 and a substantially vertical peripheral depending skirt 13 that cooperate to form a cowling defining an open-bottom mulching chamber 14 at one side of which is a tangent, diagonal discharge spout 15. At opposite ends of the frame are integral wheel mounting arms 17 in which stub axles 19 for wheels 20 are mounted for vertical adjustment. Referring to FIG. 1 it will be noted that the span across either of the pairs of wheels is less than the diameter of the skirt 13 so that the skirt extends beyond the wheels on both sides.

Surrounding most of a central opening 21 in frame 12 is an annular ring-like spacer member 22. An annular plate 23 is mounted by bolts 24 to the top of spacer 22 which is in turn secured, e.g. by welding, to frame 12. A motor, illustrated as a gasoline engine and indicated generally at 27, is mounted on plate 23 with the motor drive shaft 28 extending downwardly through plate 23 and frame 12.

With particular reference to FIGS. 4 and 6, at the lower end of the shaft 28 is a cutter blade, indicated generally at 29.

The blade 29 is adapted to rotate clockwise as viewed in FIG. 1, and has beveled, sharpened cutting edges 30 along the leading edges of its two end portions. As best seen in FIG. 4 the blade has an upturned flange portion 31 at each end along the trailing edge to produce an ascending air current when the blade rotates which may lift loose, light material and circulate it within the skirt 12.

The carriage is driven through a forward-reverse transmission 32 and a disengageable carriage drive mechanism, indicated generally by reference numeral 33, off a cam shaft 40 of the engine 27. The carriage drive mechanism utilizes a pair of toothed drive pinions 34 that are mounted at opposite ends of a shaft 35 so as to drive through engagement with tires 20a of opposite carriage wheels 20, as is more fully described and claimed in my U.S. Patent No. 2,771,959, entitled, "Sharp-Toothed Tire Engaging Members for Driving Vehicle Wheels," patented November 27, 1956. As best seen in FIGS. 1 and 5, shaft 35 is carried in a bracket 36 that is pivoted on supports 37; and a leaf spring 38 is mounted on one of the supports 37 and bears on the underside of bracket 36 to retain the pinions 34 normally out of contact with tires 20a. The pinions are moved into driving engagement with the tires by a mechanism to be described.

Referring especially to FIGS. 1, 2, 4 and 6, the cam shaft 40 of engine 27 protrudes downward from the motor housing and through an opening in plate 23; and a pulley 42 on the cam shaft carries a belt 44 that is also trained around a pulley 47 on the input shaft 48 of transmission 32 so as to constantly drive the transmission. Belt 44 extends through an opening 49 in spacer member 22, and is above the cowling 12.

Mounted on top of the cowling 12 are a pair of members 50, the upright portions of which form brackets 51 each of which has a pair of notches 52 and 53, one or the other of which may be engaged by lugs 54 on a handle 55 that is pivoted at 56 on the vertical median lines of the brackets. Thus, the handle may be inclined toward either end of the machine, and the machine may be pushed or driven in either direction. The handle mounting is described in detail and claimed in my U.S. Patent No. 2,763,492, entitled "Reversible Handle Mounting for a Mower," patented September 18, 1956.

Although other transmissions and transmission types suitable for use in accordance herewith will be apparent to those in the art, the transmission illustrated is a Foote single-speed reversing transmission model P–333 marketed by the J. B. Foote Foundry Company, Dearborn, Michigan, U.S.A., having forward and reverse outputs selectable by the disposition of a pin 58. The assembly of the model P–333 Foote transmission is specifically shown on assembly diagram and parts list entitled "Foote Reversing Transmission P–333CN," available from J. B. Foote Foundry Co. Thus, assuming a constant input to shaft 48, sliding of pin 58 inward with respect to the housing of transmission 32 results in rotation of the transmission output shaft 59 in one direction and withdrawing the pin outward with respect to the housing results in reversing the direction of rotation of shaft 59. In the particular transmission, spaced circumferential grooves (not shown) on the pin 58 cooperate with a spring pressed ball to latch the pin selectively in either position. A sprocket 60, mounted on output shaft 59, carries a chain 61 through which it drives another sprocket 62 that is secured to the shaft 35 that carries the drive pinions 34.

Withdrawal of pin 58 of transmission 32 results in counterclockwise rotation of shafts 59 and 63 while movement of pin 58 to its innermost position results in clockwise rotation of shafts 59 and 63. As will be seen, when handle 57 is in the position shown in full lines in FIG. 2, i.e., to the left, pin 58 is withdrawn and members 34 are driven counterclockwise to drive wheels 20 clockwise for driving carriage 11 to the right. When handle 57 is pivoted about its pivots 64 to the right to the position shown in phantom in FIG. 2, pin 58 moves inward past neutral position and to a position reversing the rotation of shaft 59 to clockwise rotation as viewed in FIG. 2, resulting in rotation of wheels 20 counterclockwise for driving carriage 11 to the left. Thus, carriage 11 is always driven in the opposite direction from the disposition of handle 57 and the direction of carriage movement can be simply and readily reversed merely by pivoting handle 57 about its pivotal attachment at 64.

A reverse control linkage, best seen in FIGS. 1, 3, and 7 to 10, includes an angle bracket 67 secured to one of the lugs 54 on handle 55, and a plate 70 that is pivotally connected to the bracket 69 has a bore 71 impaled by a rod 72. Mounted on rod 72 flanking the plate 70 are compression springs 73 and 73a confined, respectively, between stops 74 and 74a on rod 72, and the plate 70. Rod 72 extends toward transmission 32 and terminates in a universal joint 77 which connects rod 72 to a transmission control rod 78 that has a bent end 79 journalled in a bore in a channel-shaped lever 80 (FIGS. 7 to 10). The lever 80 is loosely secured to pin 58 by means of a cotter pin 83, and a shoulder 81 on the lever bears on a fulcrum point 82 on the transmission housing 32 so that rocking of lever 80 about point 82 moves the pin 58 in or out to reverse the transmission. It is apparent that the springs 73 and 73a permit lost motion and cushion the action of rod 72 and lever 80 when the transmission mechanism controlled by pin 58 is feeling its way into mesh with a dog clutch incorporated within the transmission. The spring assembly also helps assure that the output shaft of the transmission will be permitted to come to a stop or low rate of rotation prior to reversal of direction of rotation under power.

Selective movement of the toothed pinions 34 into engagement with the tires 20a, as heretofore mentioned, is accomplished by a drive control handle 81 that is pivoted at 82 on a boss 83 that is on one side of handle 55 in close proximity to one of the handle grips 55a. Thus, handle 81 may be pivoted from the position shown in FIG. 1 toward the hand grip 55a; and a flexible wire control system, indicated generally at 84, has one end pivotally connected to a boss 85 on the handle 81 by means of a turnbuckle 86, and has its opposite end secured to the bracket 36 for the toothed drive pinion 34 by means of a bolt and nut assembly 87. Thus, movement of the handle 81 toward the handgrip 55a pulls a flexible wire 88 of the assembly 84 and thus pivots the bracket 36 downwardly against the force exerted by the leaf spring 38 and moves the toothed pinion 34 into driving engagement with the tires 20a. As best seen in FIG. 1, the flexible wire assembly includes the wire 88 and a guide tube 89 which is secured to the handle by a bracket 90, passes through a bracket 91 on the handle latch plate 54 that is opposite the bracket 67 of the reversing mechanism, and the tube 89 turns into the pivot axis of the handle pivot 56 and terminates in said pivot axis. The flexible wire 88 then enters a second section of center tubing 92 which also has an end in the pivot axis aligned with the adjacent end of the tube 89; and the tube 92 is secured to the cowling 12 by means of brackets 93 and terminates an upwardly extending end portion 92a that is directly beneath the nut and bolt assembly 87. The break between the tube section 89 and the tube section 92 on the pivot axis 56 of the handle 55 is necessary to permit the handle to be moved from one end of the mower to the other, as is heretofore described.

In operation, the mower engine is started and blade 29 rotates in normal rotary mower fashion. Blade 29 draws air into the chamber 14 and forces the cut and mulched grass through spout 15 and diagonally to one side of the path of travel of the mower. The device may be operated with or without motive power to the wheels by engagement or disengagement of toothed members 34 in the manner described above.

It will be noted especially with reference to FIGS. 2, 4, 7 and 8 that belt 44 is disposed above the frame plate 12, so that the plate protects the belt from contact with clippings in the mulching chamber. If the belt were in the mulching chamber, a shield would be required to keep clippings from fouling the belt, and any projection into the chamber tends to upset the flow of air through chamber 14.

For advantageous operation of the device, the carriage 11 may be propelled under power in one direction for mowing grass, and, at the end of the line, the handle 57 may be simply pivoted over the top after movement of lever 81 to disengage the drive to the wheels. Reversing the handle automatically reverses the transmission 32; and this occurs when there is no load on the output shaft other than the friction load of the chain 61, sprocket 62, and shaft 35. As the handle 57 is moved through the remainder of its arc, the direction of rotation of shaft 59 is reversed and pivoting the control handle 81 again engages the drive to the wheels; the carriage proceeds back whence it came, steerable by handle 57 to cut an adjacent line or row of grass. Such back and forth operation without turning the carriage lends to ease of operation, and the grass ejected from chamber 14 through opening or spout 15 may always be ejected to the uncut grass where on a subsequent pass with the mower it may again be picked up and mulched further.

The foregoing detailed description is given for clearness of understanding only and no unnecessary limitations are to be understood therefrom, as some modifications will be obvious to those skilled in the art.

I claim:

1. In a manually guided rotary power mower, having a wheeled frame and a driving motor, in combination: handle means mounted on the frame on a transverse axis for pivotal swing-over movement less than 180 degrees in opposite directions between two inclined positions with the handle overlying and projecting beyond opposite ends of the frame; a power train for driving the mower from the motor; a reversing transmission in the power train for selectively driving the mower in either direction, said transmission including mechanical reversing means; linkworks means mounted for movement relative to the handle in the general direction of handle movement and operatively connected to said mechanical reversing means; resilient force transmitting means mounted for receiving force from movement of said handle in either direction and for transmitting the force to said linkworks means to resiliently move said linkworks means in the corresponding direction whereby movement of the handle in each direction to project beyond a selected end of the frame resiliently urges the linkworks means to move said reversing means and condition the transmission to drive the mower with the handle means projecting beyond the trailing end; and locking means for releasably locking said handle in each of said positions.

2. A motor driven reversible power mower comprising a carriage, a motor mounted thereon, a drive train for driving the carriage from the motor and including a reversing transmission having a dogging element mounted for movement in opposite directions from a central neutral position for engaging said transmission to drive in respective opposite directions, a steering handle pivotally mounted on said carriage on a generally horizontal axis for pivotal movement between inclined positions overhanging opposite ends respectively of said vehicle, stop means for stopping said handle in each of said positions substantially less than 180 degrees of pivotal movement from the other position, and resilent means responsive to movement of said handle from either of said positions to the other for moving said dogging element in a corresponding direction to reverse said transmission.

3. In a manually guided rotary power mower, having a wheeled frame and a driving motor, in combination: handle means mounted on the frame on a transverse axis for pivotal swing-over movement less than 180 degrees between two inclined positions with the handle overlying and projecting beyond opposite ends of the frame; a power train for driving the mower from the motor; a reversing transmission in the power train for selectively driving the mower in either direction, said transmission including mechanical reversing means; a linkage operatively connecting said mechanical reversing means to the handle means so that movement of the handle means in each direction to project beyond a selected end of the frame conditions the transmission to drive the mower with the handle means projecting beyond the trailing end; and locking means for releasably locking said handle in each of said positions.

4. In a manually guided rotary power mower, having a wheeled frame and a driving motor, in combination: handle means mounted on the frame for movement between two positions in which portions of the handle project in an inclined manner from either end of the frame; a power train for driving the mower from the motor; drive control means including a manual lever on the handle for selectively engaging and disengaging the power train; a reversing transmission in the power train for selectively driving the mower in either direction, said transmission including mechanical reversing means; and a linkage operatively connecting said mechanical reversing means to the handle means so that movement of the handle means to project from a selected end of the frame conditions the transmission to drive the mower with the handle means projecting from the trailing end, said linkage comprising a link including a universal joint, a bracket mounted on said handle and carried thereby, said link slidably impaling said bracket, resilient means in force receiving association with said bracket for centering said link relative to said bracket upon movement of said handle to either of said two positions to thereby resiliently urge said link responsive to force applied to said resilient means by movement of the handle toward either of said two positions, and means securing the other end of said link to said reversing means.

5. In a manually guided rotary power mower, having a wheeled frame and a driving motor, in combination: handle means mounted on the frame on a transverse axis for pivotal swing-over movement less than 180 degrees between two inclined positions with the handle overlying and projecting beyond opposite ends of the frame; a power train for driving the mower from the motor including a selectively engageable drive linkage between said motor and wheels; resilient means biasing said drive linkage toward a disengaged released position breaking said train; drive control means including a manual lever on the handle for selectively positively engaging or releasing said drive linkage; lock means for locking said lever with said linkage engaged; a reversing transmission in the power train for selectively driving the mower in either direction, said transmission including mechanical reversing means; a reversing linkage operatively connecting said mechanical reversing means to the handle means for movement in opposite directions to reverse said transmission responsive to movement of the handle means in a corresponding direction to project beyond a selected end of the frame whereby the transmission is conditioned to drive the mower with the handle means projecting beyond the trailing end; and locking means for releasably locking said handle in each of said positions.

6. The manually guided rotary power mower of claim 5 wherein said drive control means comprises a cable extending from said lever to said drive linkage and including means mounting a portion of said cable in alignment with said transverse axis intermediate said lever and said drive linkage.

7. A manually guided rotary power mower comprising a wheeled carriage, a motor on said carriage, a power train for driving said carriage from said motor, a rotary grass cutting blade mounted for rotation by said motor, a grass delivery chute on said carriage for delivering grass from said cutting blade laterally to one side of said carriage, handle means mounted on the carriage on a transverse axis for pivotal swing-over movement less than 180 degrees in opposite directions between two inclined positions with the handle overlying and projecting beyond opposite ends of said carriage, a reversing transmission in said power train for selectively driving said carriage in either direction, and means responsive to movement of said handle for reversing said reversing transmission when said handle is pivoted over-center from either inclined position to the other to always drive said carriage in a direction with said handle at the trailing end of the carriage.

8. The power mower of claim 7 wherein said means for reversing comprises means resiliently linking said reversing transmission to said handle, said resilient linking means including lost motion means permitting movement of said handle relative to said reversing transmission at and adjacent each of said handle positions.

References Cited by the Examiner

UNITED STATES PATENTS

| | | | |
|---|---|---|---|
| 2,696,889 | 12/1954 | Mott | 180—19 |
| 2,763,492 | 9/1956 | Phelps | 280—47.36 |
| 2,823,507 | 2/1958 | Cooper et al. | 180—19 X |
| 2,918,775 | 12/1959 | Hollerith et al. | 56—25.4 |
| 2,947,132 | 8/1960 | Shaw | 180—19 X |
| 2,962,854 | 12/1960 | Jepson | 56—25.4 |
| 2,996,134 | 8/1961 | Muerle | 180—19 |
| 3,014,546 | 12/1961 | Banka | 180—19 |

FOREIGN PATENTS

| | | |
|---|---|---|
| 778,659 | 7/1957 | Great Britain. |
| 877,186 | 9/1961 | Great Britain. |

BENJAMIN HERSH, *Primary Examiner.*

A. HARRY LEVY, *Examiner.*

J. A. PEKAR, *Assistant Examiner.*